Figure 1:
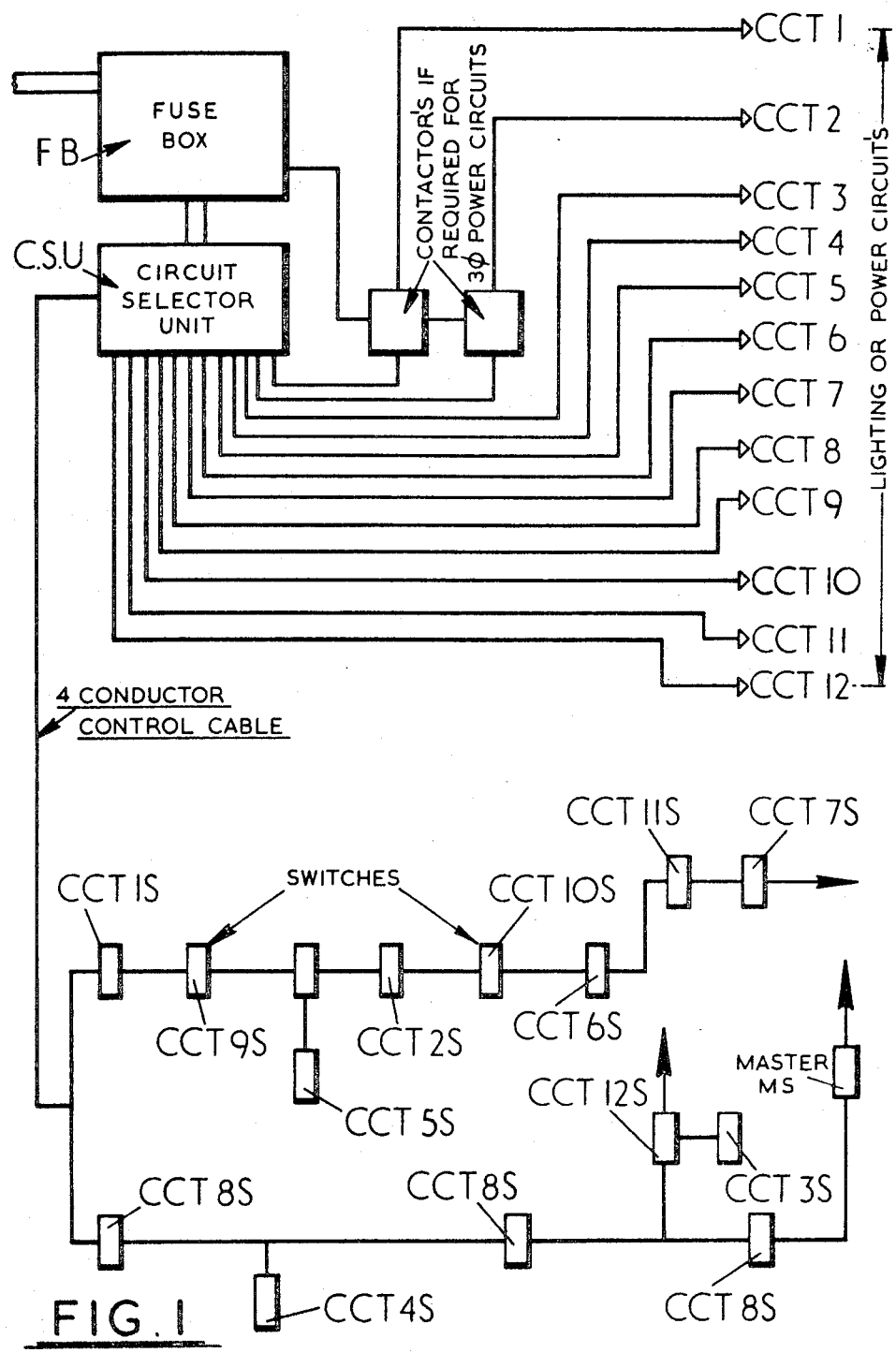

United States Patent [19]
Jones

[11] 3,710,200
[45] Jan. 9, 1973

[54] SWITCHING CONTROL SYSTEMS
[76] Inventor: Robert Henry Jones, 17 Marsha Drive, Agincourt, Ontario, Canada
[22] Filed: June 16, 1970
[21] Appl. No.: 46,601

[30] Foreign Application Priority Data

June 18, 1969 Great Britain.....................30,827/69

[52] U.S. Cl................317/134, 317/135 A, 317/137, 317/148.5 B, 307/252 L
[51] Int. Cl. .......................H01h 47/32, E05b 49/00
[58] Field of Search .......317/134, 135 A, 137, 135 R

[56] References Cited

UNITED STATES PATENTS 3,441,808   4/1969   Crane..............................317/135 A Primary Examiner—L. T. Hix
Attorney—Holman & Stern

[57] ABSTRACT

A switching control system for selectively controlling switching of power to utilization devices in which the latter are connected to control switch units by a cable having a smaller number of conductors than the number of utilization devices, each control switch unit having a number of contacts equal to the number of conductors less one. The system also includes a circuit selector unit connected to the cable and including a decoding means for determining the sequence of contact operation in a control switch unit and for controlling power supply to a selected utilization device, the number of the latter being substantially greater than the number of cable conductors.

7 Claims, 3 Drawing Figures

SWITCHING CONTROL SYSTEMS

This invention relates to switching control systems for controlling the switching of power to a number of utilization circuits, such for example electric lights.

With present arrangements for controlling a substantial number of utilization circuits, a separate run of external cable is required between each such circuit and a controlling switch so that a large number of runs of wire are required in total.

An object of the invention is to provide a switching control system for controlling a substantial number of power utilization circuits using a substantially lower number of external cables running to the switches.

According to the invention, a common external cable containing a small number of conductors is run to all of a number of control switch units of a system and to a circuit selector unit, each switch unit containing a number of contacts equal to the number of conductors less one and the circuit selector unit including means to decode the sequence of operation of the contacts in a switching unit and to control the supply of power to a utilization circuit selected from a plurality of utilization circuits substantially greater in number than the number of conductors in the said common cable.

For example, twelve utilization circuits may be controlled by switch units having three contacts each and having a four conductors common cable. Preferably the switching is carried out at low voltage. There is a unique sequence of operation of the contacts for each utilization circuit and the circuit selector unit decodes the sequence of voltage pulses on three of the four conductors and operates the selected utilization circuit.

Figure 2:
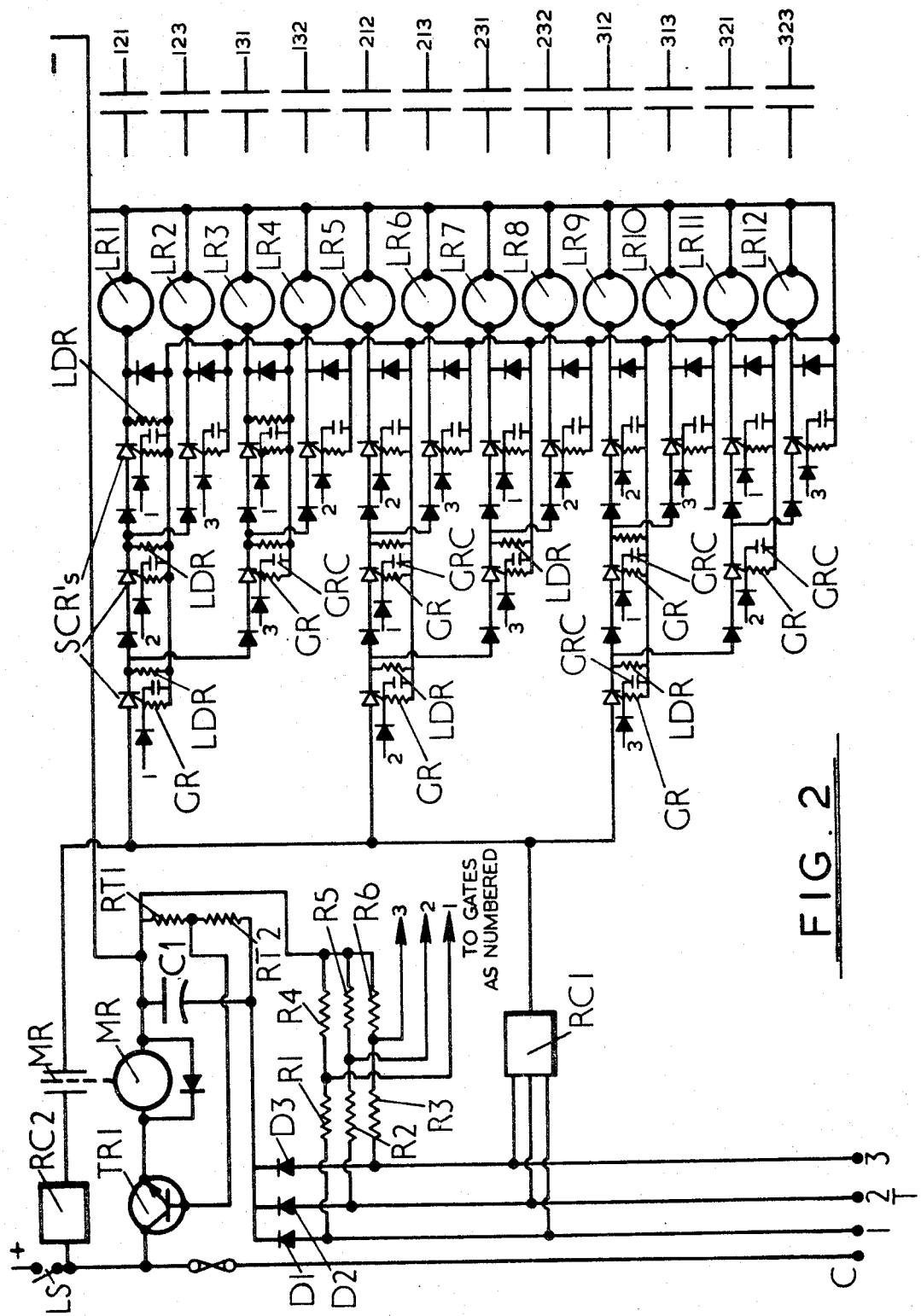
Figure 3:
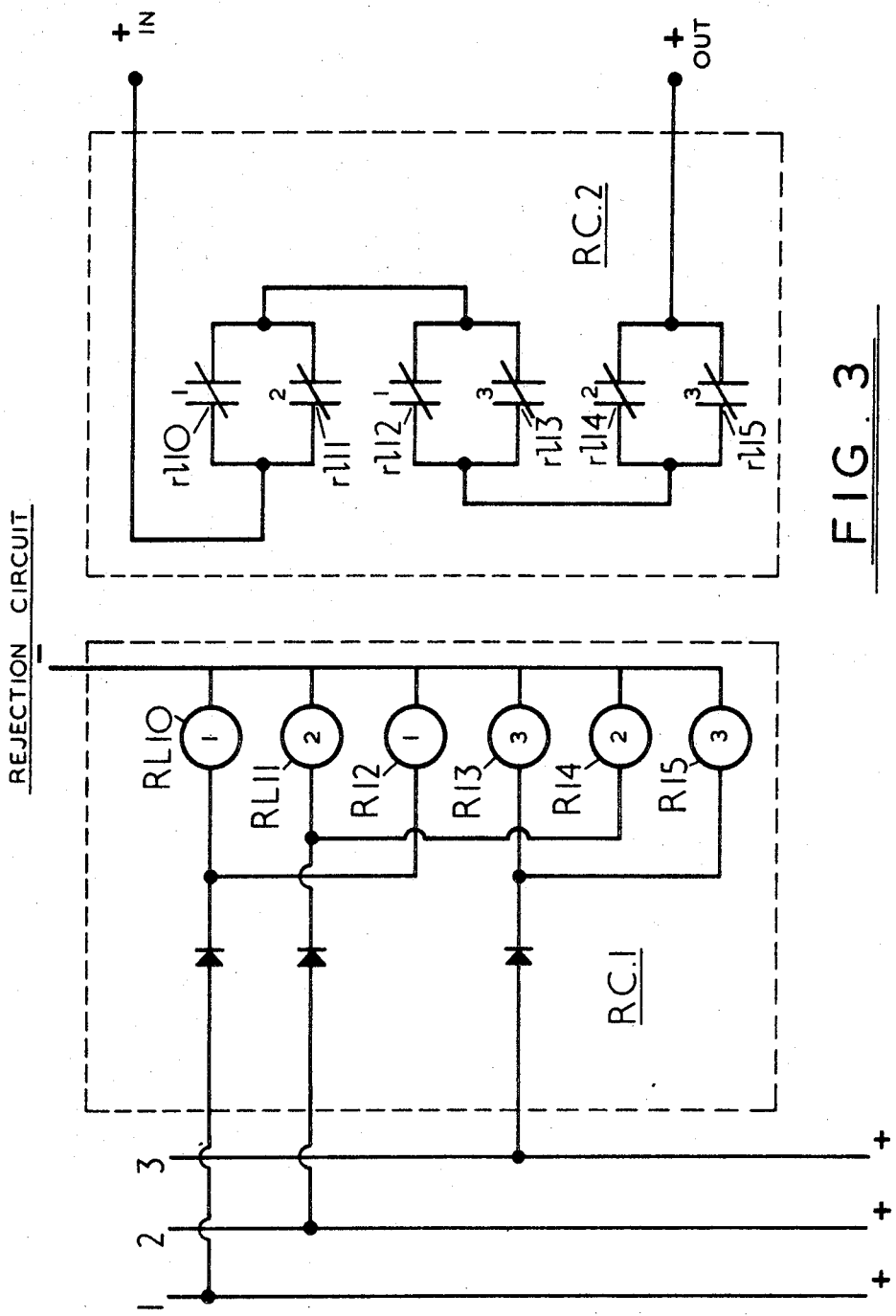

Embodiments of the invention will now be described with reference by way of example, to the accompanying drawings, in which:

FIG. 1 is a schematic diagram of a switching control system in accordance with the invention, FIG. 2 is a circuit diagram of a circuit selector unit suitable for the system shown in FIG. 1, and FIG. 3 shows further detail circuitry of the unit shown in FIG. 2, to prevent overlapping operation of the switching units giving an incorrect selection.

Referring to FIG. 1 electric power is supplied from a fuse box FB to a circuit selector unit CSU, (additional contactors being provided if the supply is three-phase). The circuit selector unit has connections to twelve utilization circuits CCT1 – CCT12 to which power is selectively to be supplied. The control of the circuit selector unit is via a four conductor external cable from a number of control switch units CCT1S – CCT12S or a master MS. Each remotely disposed control switch has three normally open spring return contacts which are momentarily closed or opened in definite sequence thus transmitting three voltage pulses on different respective conductors of the external cable to the circuit selector unit CSU which is essentially a solid state decoder which decodes the sequence and operates a contactor for supply of power to the appropriate utilization circuit. Two way or multiple switching requirements are provided by arranging the necessary control switches to have the same code, such as switches CCT5S. Master switches may be provided whereby any code of voltage pulses may be sent.

FIG. 2 is a circuit diagram of a suitable circuit selector unit. The three voltage pulses from the control switches arrive at terminals T 1, 2, 3.

The numerical coding of the three incoming pulses determines which one of the 12 available routes is utilized to energize one of the latching relays LR1–12, which upon energization opens or closes its contacts to change its switched state each time a voltage is applied to the coil.

Closing the first digit contact of any remote control switch unit CCT1S–12S applies a positive voltage pulse to one of lines or conductors 1, 2 or 3 of the external cable this in combination with a negative line connection to relay MR as shown in FIG. 2, indirectly energizes relay MR via diodes D1, D2 or D3 and via the transistor TR1 and also initiates the time delay circuit comprising capacitor $C_1$ and resistors RT1 and RT2. Closing of the MR contacts primes the coding circuit for operation.

Simultaneously, a gating pulse derived from resistors R1, R4, R2, R5, or R3, R6 is applied to all silicon controlled rectifiers (S.C.R.'s) gated with the same digit as the selected code line, and thus, all S.C.R.'s with a source voltage, will commence conduction and pass current through load resistors LDR. Likewise for the second impulse transmitted.

The third impulse transmitted to the code selector unit, gates a final S.C.R. which is directly coupled to a latching relay LR1–12. Engergizing a relay LR1–12 changes the state of the relay contacts controlling the external circuit and the relay contacts will remain in that state, until that relay LR is again energized. After the third impulse has been received, time delay circuit $C_1$, RT1 and RT2 disconnects the decoding circuitry from its voltage source by releasing relay MR after a predetermined time delay (for example about 0.8 sec). When relay MR releases, the potential is removed from the S.C.R.'s and conduction ceases, thereby preparing the system for the next selected codes.

As an example let us assume that circuit 7 is required to be switched "on" (or off). Referring to the circuit diagram, it is shown that the numeric coding for this circuit is 231. The appearance of a positive voltage on line 2 causes relay MR to be energized, the current passing through diode D2 and transistor TR1 to relay coil MR. Simultaneously to the energizing of relay MR the capacitor C is charged thus initiating a controlled off delay for relay MR by the utilization of resistors RT1 and RT2 in conjunction with transistor TR1. This of course closes contacts MR which apply full positive voltage to the first S.C.R.'s located on lines LR1, LR5 and LR9. Since a gate voltage is present at one only of these S.C.R.'s (the one located on line LR5) this is the only S.C.R. brought into conduction, a load path being provided by its own load resistor LDR. The second pulse which is derived by making line 3 momentarily positive, resets the 0.8 sec. time delay and ensures that contacts of relay MR remain closed. The gating pulse derived from the junction of R3 and R6 is applied to all S.C.R.'s with gate 3. The S.C.R. on LR 7 and the first S.C.R. on line LR9 will be brought into conduction, load paths being provided by their own load resistors LDR. The third impulse, when line 1 is momentarily positive, again resets the time delay of relay MR and also provides a gating voltage to all S.C.R.'s with a number 1 gate. As the S.C.R. adjacent to LR 7 is now brought into conduction by the number 1 gating pulse, relay LR 7 is energized, and the power carrying contacts change state. The selected code is now complete, and no further positive voltages are received from lines 1, 2, and 3, and after a short delay contacts MR will open and remove the source voltage from all S.C.R.'s thus making the routes available for the next codes.

Master switches may be inserted in the external circuit at any point, a master switch being simply a switch with its 3 contacts wires in 1, 2, 3 sequence and the codes "punched out" as required. If for any reason one or two digits only are depressed and a delay greater than 0.8 sec. occurs relay MR opens thus resetting the system. The diodes which are connected across the 12 LR relays are provided for reverse surge protection, which occurs when any current carrying inductive circuit such as the relay coils, are electrically interrupted. Diodes are provided to the gating resistors and between S.C.R.'s to overcome self triggering and to produce a more stable circuit.

It is to be noted that each gate resistor GR of each S.C.R. has connected in parallel with it a small capacitor GRC, (for example 16μF 40v.). These capacitors GRC have the effect of removing "spikes" which tend to cause erratic behavior.

To prevent overlapping operation of the switches providing a wrong selection, rejection circuits RC1 and RC2 are provided. These are shown in more detail in FIG. 3. Circuit RC1 consists of relays RL10–15 connected to the three impulse lines and circuit RC2 consists of contacts r1 10–15 of the relays in parallel series arrangement such that if there are simultaneous signals on any two of the lines, and hence simultaneous operation of the relays, both contacts of one of the parallel sets become open and no supply voltage is provided through contacts MR.

If it is desired to render all of the switches inoperative and to maintain the status of the latching relays a voltage control switch may be provided at LS.

The electro-magnetic relays may be replaced by thyristor switches or any other solid state switching device, if desired.

What is claimed is:

1. Switching control system for controlling the switching of power to a plurality of utilization devices, said system comprising a common external cable which contains a smaller number of conductors than the number of utilization devices, said conductors running between all of a plurality of control switching units and a circuit selector unit to which a power supply is connected, each control switch unit containing a plurality of contacts equal to the number of conductors in the external cable less one, said plurality of contacts generating a sequential code on various ones of said conductors during operation, said circuit selector unit including means to decode a given sequence of operation of the contacts of a control switch unit and to control the supply of power to a specific utilization device selected from the plurality of utilization devices by said code, and wherein the decoding means comprises a series parallel combination of silicon controlled rectifiers, the control gate of each said rectifier being connected to receive pulses from a respective one of said cable conductors.

2. A switching control system as claimed in claim 1, wherein said means of said circuit selector unit alternately energizes and de-energizes a utilization device upon successive generation of the same code.

3. A switching control system as claimed in claim 2, wherein the control switch units comprise a plurality of switching elements which are momentarily operated in predetermined definite sequence to produce voltage pulses in sequence on respective conductors of the cable.

4. A switching control system as claimed in claim 3, wherein a master switch unit is provided and which includes switching elements which may be momentarily operated in any desired sequence according to a code of any of said utilization devices.

5. A switching control system as claimed in claim 3, wherein the circuit selection unit includes a time delay device which energizes the decoding means upon receipt of a pulse on any conductors of the cable and maintains the energization for a predetermined interval long enough to bridge the interval between pulses in a sequence.

6. A switching control system as claimed in claim 1, wherein each parallel path of said rectifiers in the series parallel combination is coupled with a latching relay type device which changes its switching state at each energization.

7. A switching control system as claimed in claim 5, comprising means to prevent overlapping operation of the control switch units providing a wrong selection, said means comprising a plurality of relay type devices connected to said cable conductors and having their switching elements connected in a series parallel arrangement and in series with the time delay device so that if pulses exist simultaneously on two or more conductors the energization of the decoding means is interrupted.

* * * * *